March 7, 1950  W. H. TURNER  2,500,014
PHONO-CUE SYSTEM

Filed Aug. 10, 1944  3 Sheets—Sheet 1

WILLARD H. TURNER,
INVENTOR.

BY *(signature)*
ATTORNEY.

March 7, 1950 W. H. TURNER 2,500,014
PHONO-CUE SYSTEM
Filed Aug. 10, 1944 3 Sheets-Sheet 2
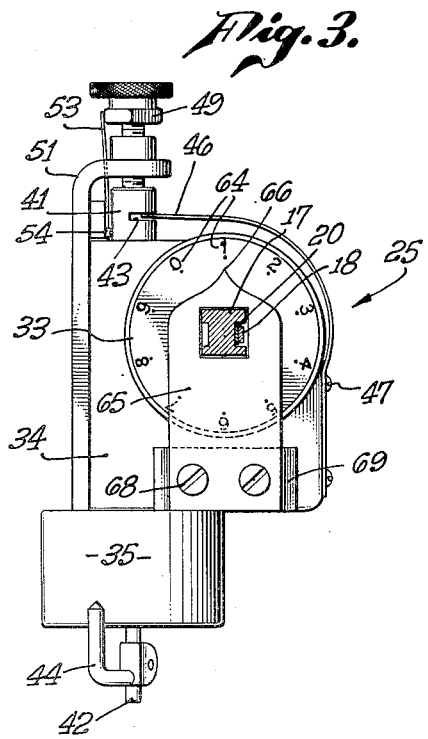
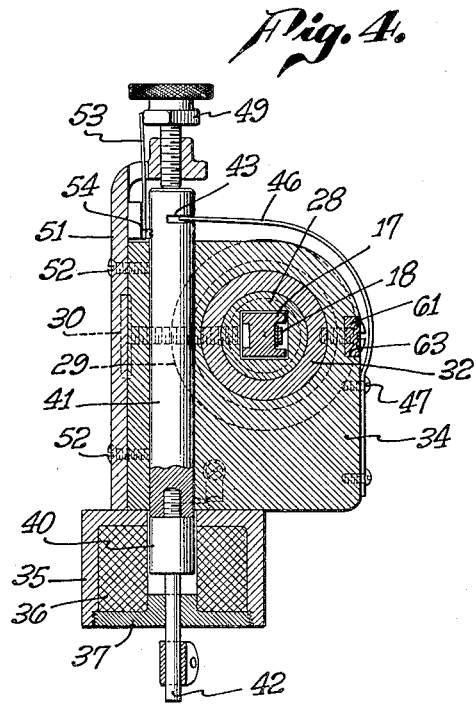
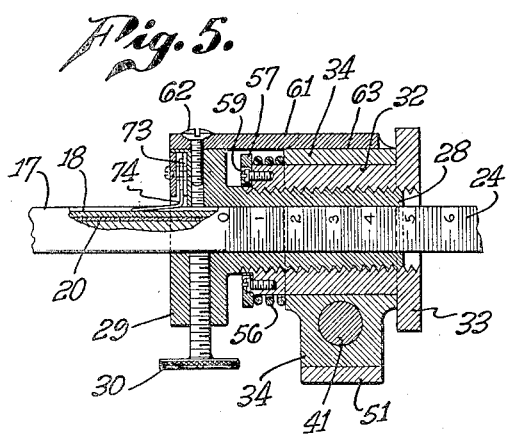
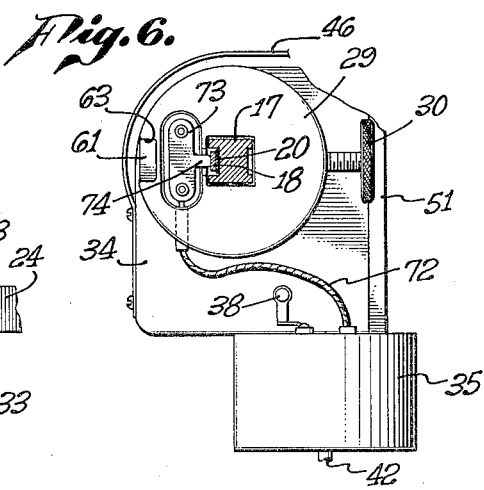
WILLARD H. TURNER,
INVENTOR.
BY
ATTORNEY.

March 7, 1950        W. H. TURNER        2,500,014
PHONO-CUE SYSTEM
Filed Aug. 10, 1944        3 Sheets—Sheet 3
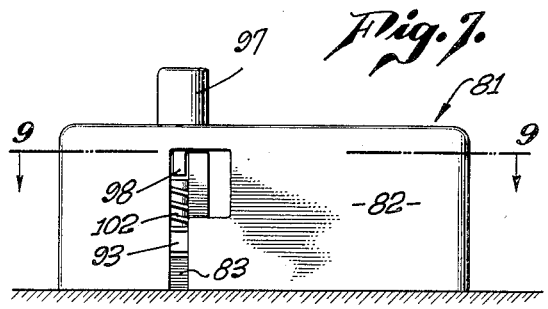
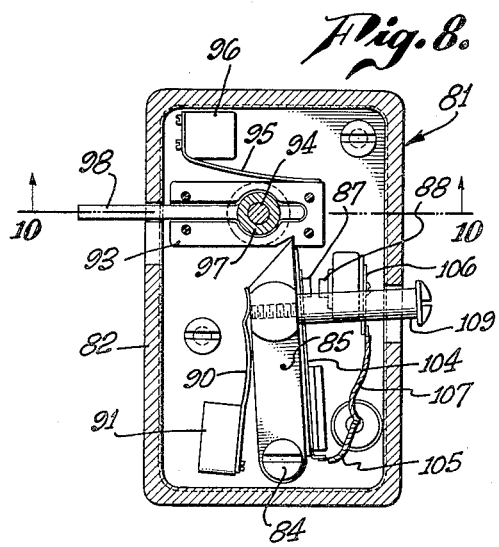
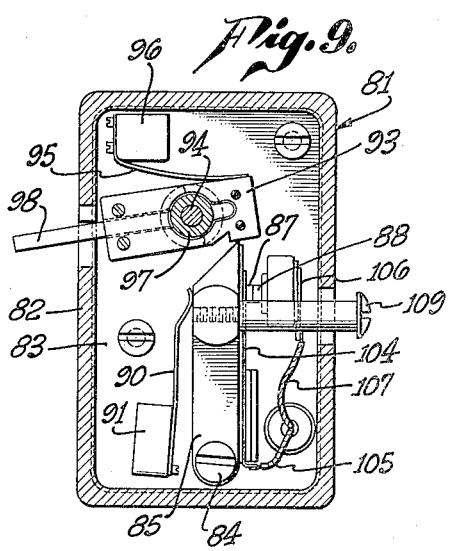
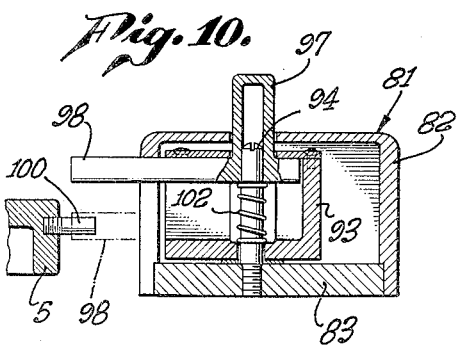
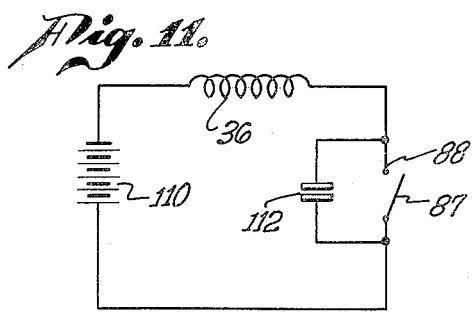
WILLARD H. TURNER,
INVENTOR.
BY
ATTORNEY.

Patented Mar. 7, 1950

2,500,014

UNITED STATES PATENT OFFICE 2,500,014

PHONO-CUE SYSTEM

Willard H. Turner, Los Angeles, Calif., assignor to Radio Corporation of America, a corporation of Delaware Application August 10, 1944, Serial No. 548,903

10 Claims. (Cl. 274—9)

1

This invention relates to sound motion picture apparatus, and particularly to a sound cuing device whereby sound reproduction may be started at any predetermined point on a record, such as a phonograph disc.

In the art of sound motion picture production, the majority of sequences are rehearsed many times before the final scene is photographed and the concomitant sound is recorded. During the rehearsals, a sound record is frequently used to reproduce pre-recorded music or dialogue in order to synchronize dancers or singers or the dialogue of actors appearing only in that particular sequence. That is, most dance scenes require a number of rehearsals before they are perfected to the extent where the director considers them satisfactory for photographing. The music for the scenes is generally recorded prior to the rehearsals of dance scenes and is made into phonograph records. These records are then used to produce the music for the rehearsals, thus eliminating the orchestra during these periods. During these dance numbers, the director frequently desires to rehearse certain portions of the scene without repeating the whole sequence. In such instances, the reproduced music must start at a certain point between the ends of the record. The present invention permits the starting of the sound at any predetermined point decided upon.

Another instance of use of the invention is where a scene involves diologue between two or more actors, but only one appears in the scene. For the purpose of synchronizing the spoken dialogue of a scene with the dialogue of the actor not shown in the scene, the speech of the "off stage" actor may be reproduced from a record. In such instances, the missing actor's dialogue is played back during the rehearsal, and it may be decided to start the record in the middle of a scene. This may be accomplished with the present invention.

In a singing scene, the song is usually prerecorded under optimum conditions in a sound booth, and then played back to the actor or actress during the rehearsals and/or the photographing of the scene. The actor or actress sings along with the record but the song is not recorded which permits the actor or actress to concentrate on his or her gestures. In rehearsing such a scene, it frequently occurs that a director starts at a certain point in the scene without repeating the entire scene. In such cases, the present invention is particularly applicable; since it permits accurate cuing to any exact word in the song.

The invention, therefore, involves a device which automatically places the stylus of a reproducing head at the proper point on a record after this point has been previously determined. It involves the electrical actuating of a positioning device which is accurately adjustable to any exact point on the record. The operation of the system is semi-automatic to the extent that it is manually set for operation within a revolution of the turntable of a phonograph after which the turntable actuates the mechanism at the exact point on the record. Although pickup locating mechanisms are known in the art, one of which being disclosed and claimed in U. S. Patent No. 2,135,035 of November 1, 1938, the present invention simplifies the locating operation, is extremely accurate, and is particularly adaptable to motion picture production.

An object of the invention, therefore, is to facilitate the reproduction of any selected portion of a sound record.

Another object of the invention is to provide an improved means for pre-selecting a certain portion of a sound record to be reproduced.

A further object of the invention is to automatically position a reproducer head on a record at a pre-selected point.

A further object of the invention is to provide a system whereby a predetermined point on the record may be accurately determined and indicated so that the record may be reproduced beginning at the same point.

A still further object of the invention is to provide an accurate device for positioning a sound pickup with respect to a predetermined point on a sound record and to bring said pickup into contact with said record at said point.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 3 is an elevational view of the positioning head taken along the line 3—3 of Fig. 2.

Fig. 4 is a cross sectional view of the positioning head taken along the line 4—4 of Fig. 2.

Fig. 5 is a cross sectional view of the positioning head taken along the line 5—5 of Fig. 2.

Fig. 6 is a partial view of the positioning head taken along the line 6—6 of Fig. 2 to show the electrical connections thereto.

Fig. 7 is an elevational view of the actuating trip switch.

Figs. 8 and 9 are cross sectional views of the interior mechanism of the switch showing both set and tripped positions, and taken along the line 9—9 of Fig. 7.

Fig. 10 is a cross sectional view of the mechanism for manually actuating the switch to tripping position taken along the line 10—10 of Fig. 8, and Fig. 11 is an electrical circuit for the actuating switch and positioning head.

Figure 1:
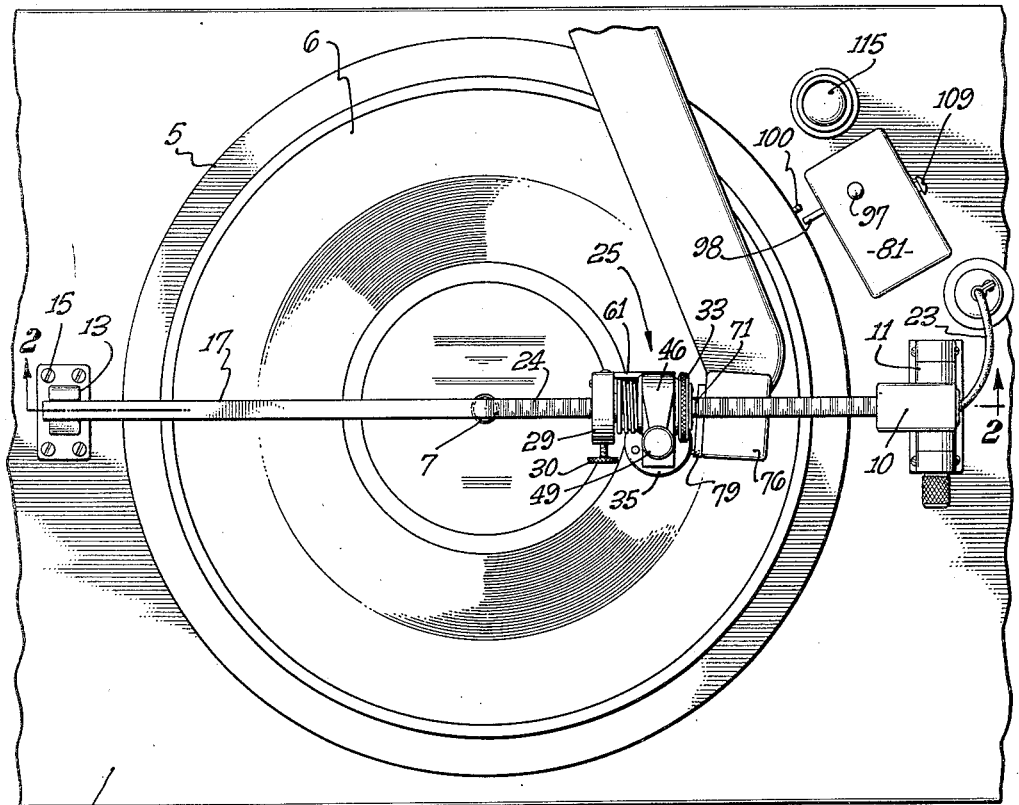
Fig. 1 is a plan view of the invention shown in relationship to a phonograph turntable.
Figure 2:
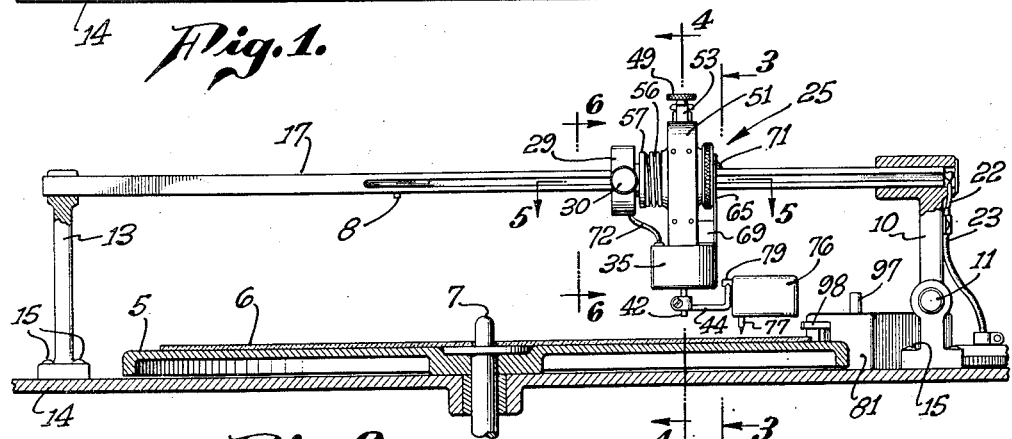
Fig. 2 is a cross sectional elevational view of the invention taken along the line 2—2 of Fig. 1.

Referring now to the drawings in which identical elements are given the same numerals and particularly to Figs. 1 and 2, a turntable 5 is shown with a disc record 6 positioned thereon over a spindle 7. The turntable may be driven in any suitable manner well-known in the art. To the right of the turntable 5 is a post support 10 pivoted or hinged at 11, while on the left of the turntable is a post support 13, both the posts being mounted upon the table or console top 14 in any suitable manner, such as by screws 15. The upper end of the post 10 has a square broached opening therein in which is fixedly attached a substantially square shaped horizontal carrier bar or rod 17, the left end of which rests in a notch at the upper end of post 13. This type of mounting permits the rod 17 to be lifted and rotated about the pivot 11 to clear the turntable and record. The bar 17 has a copper contact strip 18 extending along the major portion of its length and insulated therefrom by a strip of insulation 20. (See Figs. 3–6.) The copper strip is connected at its right end to a conductor 22, while a second conductor contained within a cable 23 is connected to the rod or bar 17. The upper side of the rod carries indicia 24 as shown in Figs. 1 and 5, while a stop screw 8 is attached to the carrier bar 17 as shown in Fig. 2.

Mounted for longitudinal adjustment along the bar 17 is a sound pickup positioning device 25, the bar 17 passing through a broached hole in an externally threaded member 28 having an integral larger diameter locking collar 29 in which a thumb nut set screw 30 is located for locking the member 28 at some adjusted position on the rod 17. Threaded on the member 28 is a cylindrical adjusting nut 32 having an integral knurled hand wheel or flange 33. Mounted on the nut 32 is a main housing 34 which supports a cylindrical shell 35 containing an electromagnetic coil winding 36 and a cover 37. Positioned within a central opening in the winding 36 is a soft iron core 40 to which is attached a cylindrical rod member 41 of non-magnetic material by a threaded lower rod member 42. Attached to the lower end of the rod 42 is a bracket carrier or hook 44, the end of which extends beyond the external diameter of the shell 35.

The upper rod member 41 has a notch 43 near its upper end into which a flat spring 46 has one end inserted, the other end of the spring being attached to the housing 34 by means of screws 47. The spring 46 exerts an upward pressure on the armature of the electromagnet, thus holding the soft iron core 40 above the center of coil 36, and the upper rod 41, the lower rod 42, and the carrier hook 44 in a raised position determined by the setting of a thumb screw 49 bearing on the upper end of the rod 41, the thumb screw 49 being mounted in a cover plate 51 attached to the housing 34 by screws 52. A flat spring 53 mounted by screws 54 to the cover plate 51 bears against a septagonal portion of screw 49 to hold it in adjusted position.

Referring to Fig. 5, the housing 34 is held tightly against the side of the knurled flange 33 by means of a coiled compression spring 56 abutting against the shoulder of the housing 34 and an annular plate 57 fastened to the adjusting nut 32 by means of screws 59. A bar 61 is fixedly attached to the locking collar 29 by means of a screw 62 and is slidably mounted in a notch 63 in the casing 34. (See Figs. 5 and 6.) Thus, by rotation of the nut 32, the housing 34 and consequently carrier bracket hook 44 may be adjusted along the rod or bar 17 in a vernier action.

As mentioned above, the indicia 24 indicates an approximate positioning of the device 25. To indicate the vernier adjustment, indicia 64 is positioned on the face of the knurled wheel flange 33 (see Fig. 3), an indicator 65 with a pointed end 66 being mounted by screws 68 to an extension 69 on the casing 34. A lip 71 on the indicator 65 extending over the opening through which bar 17 passes and thus over indicia 24, serves as a pointer for the rough positioning of the unit 25.

Electrical current is conducted to the winding 36 over a conductor 72 to a terminal plate 73 which has a brush element 74 contacting the copper strip 18 (see Fig. 5). The other terminal of the coil 36 is grounded to the casing 34 as shown at 38, Fig. 6, the circuit, therefore, extending from the cable 23 through the rod 17 and housing 34 to the coil and back over conductor 72, brush 74, strip 18, and conductor 22.

Referring again to Figs. 1 and 2, it will be noted that a sound pickup device 76 having a needle 77 is held above the record 6 by the end of bracket carrier hook 44 which is inserted in a grooved track member 79 extending along the side of the pickup 76. This is the position of the pickup 76 and needle 77 when the coil 36 is not energized, the exact distance between the tip of the needle 77 and the surface of the record being adjusted by the thumb nut 49. Upon energization of the winding 36, the soft iron core 40 is pulled into the center of the winding 36, thus lowering the pickup 76 so that the needle 77 contacts the record 6. As the invention is embodied in the drawings, it is adapted to be used with records cut from the inside to the outside, so that the pickup device moves from left to right and away from the hook 44. This permits de-energization of the winding 36 after a short interval, the raising of the carrier 44 not interfering with the pickup 76. However, the device may be used with records cut from the outside by reversing the position of hook 44 and placing the grooved carriage track on the opposite side of the pickup 76. As described, therefore, the positioning head 25 permits the pickup to be applied to the record at any time by energization of the coil winding 36.

The remaining description of the invention is directed to the semi-automatic switch mechanism which controls the instant of energization of the winding 36 and reference will now be made to drawings 7–10, inclusive. A switch unit is shown at 81 in Fig. 1 comprising a housing 82 having a bottom enclosing plate 83. Pivotally supported on a post 84 is an arm 85 having a contact element 87 adapted to engage a stationary contact element 88. Resiliently urging the arm 85 to the right and thus contacts 87—88 into engagement, is a spring 90 mounted on a supporting post 91. The arm 85 is adapted to be held in a position to disengage the contacts 87—88 by having its tip inserted in a notch in a member 93, pivoted on a pin 94 and urged into locking position by means of a spring 95 mounted on a post 96. Slidably mounted on pivot pin 94 is an actuating lever 98 partially within and adapted to rotate member 93. The lever 98 has a hollow finger post 97 attached thereto and extending without and above the housing 82 to depress the lever 98 to a position shown in the dotted lines in Fig. 10. The end of lever 98 when in depressed position is adapted to make contact with a pin 100 located on the rim of the turntable 5. (See Figs. 1 and 10.) When manual pressure on the post 97 is removed, the compression of a spring 102 raises the lever 98 and post 97 to the solid line position shown in Fig. 10.

The contacting element 87 is electrically connected by means of a terminal strip 104 and a conductor 105 to an external circuit, while the contact element 88 is electrically connected by a terminal strip 106 and a conductor 107 to the external circuit. Also mounted on the arm 85 is a pin 109 extending through an opening in the side of the casing 82 for the purpose of resetting the switch arm 85 so that its tip is inserted in the notch in member 93 which is thereby rotated to set position.

As shown in Fig. 8, the switch mechanism is set to tripping position. The switch will not be tripped, however, unless the lever 98 is depressed so that the pin 100 can contact the lever 98. Normally, however, the spring 102 holds the lever 98 above the pin 100 so that the pin 100 passes under the lever 98. When it is desired to actuate the switch, the lever 98 is depressed by pressure on the post 97, and as soon as the pin 100 contacts the lever 98, it rotates the lever removing the notch from the end of arm 85. This action permits the arm 85 to be moved toward the right by the spring 90 to bring the contact elements 87 and 88 into engagement. The tripped condition is shown in Fig. 9. To reset the mechanism, it is only necessary to press on the pin 109 which reinserts the tip of contact member 85 into the notch in the member 93 and the switch again becomes set for another actuation by the pin 100 when the lever 98 is depressed.

The circuit including the coil 36 and contact members 87 and 88 is shown in Fig. 11. The complete circuit includes a source of energy, such as a battery 110, while a condenser 112 may be connected across the contact elements 87 and 88 to reduce arcing.

A complete cycle of operation and the method of locating the point at which the record is to be started, will now be described. Let us assume that the director wishes to rehearse an actor in a portion of a song starting at the beginning of a certain phrase at the middle of the record. He advises the reproducer operator of this starting point by indicating several words at the beginning of the portion. The operator then plays the record until this point is located. He then stops the record at this point by holding it with his hand. With the switch 81 manually tripped and the hook 44 in its lowered position, he then moves the positioning unit to a position where the hook carrier 44 is under the track member 79. The switch 81 is then reset de-energizing the coil 36 and thus raising the reproducer above the record by the action of spring 46. The operator then releases the record and it will again rotate with the turntable 5. The next step is to trip the switch 81 to drop the pickup 76 on the record. If his first positioning of the device 25 was correct, then he resets the switch 81 by pressing the rod 109 and he is ready to go at a signal from the director which may be given him by the energization of a signal lamp 115 located on the reproducer console or cabinet. If the operator was slightly inaccurate in his first adjustment he may then rotate the vernier screw 32 in either direction and again actuate the switch 81 to determine if he has obtained the proper starting word. When the starting point is accurately determined, the operator may note the reading on the indicia 24 and 64 so that if the positioning head 25 is subsequently moved, and he desires to readjust it to the same point, he may do so by resetting the head to the noted indications.

In this manner, it has been found that the needle 77 of the pickup 76 may be placed on the record at an exact point in any groove thereof during rotation of the record. During the adjustment of the head 25, it may be necessary to slightly rotate the record 6 with respect to the turntable 5 so that proper angular correlation between the starting point on the record and the pin 100 is obtained. For subsequent reproduction starting at the same point, a mark should be placed on the record opposite the pin 100 so that the record may be replaced in the same position on the turntable. Thus, upon the signal from the director, the operator simply depresses the lever 98, and when the pin 100 contacts the lever, the needle 77 will be placed on the record immediately and at the exact point desired. The device has been found to give exceptionally accurate and dependable service, and may be quickly adjusted to any particular starting point when a portion of a scene is to be rehearsed.

I claim:

1. A device for electrically placing a sound pickup on a phonograph record on a turntable at a predetermined point on said record for reproducing said record comprising a pickup device, an electromagnet, an armature for said magnet, a carrier attached to an end of said armature, means on said pickup device adapted to be supported by said carrier, means for adjusting the positioning of said armature within said electromagnet, and resilient means for maintaining said armature in said adjusted position to support said pickup device above said record, energization of said electromagnet lowering said armature and carrier thereby lowering said pickup device on said record.

2. Apparatus as described in claim 1, in which means are provided for supporting said electromagnet, and screw means are provided for adjusting said electromagnet on said support.

3. A sound record starting device comprising a support extending over a sound record, an electromagnet mounted for longitudinal adjustment along said support and radially along said sound record, screw means for adjusting said electromagnet along said support, an armature, a portion of which is positioned within said electromagnet, a second portion extending above said electromagnet and a third portion extending below said electromagnet, means connected to the lower portion of said armature for supporting a sound pickup, resilient means connected to the upper portion of said armature for maintaining said sound pickup in a predetermined position above said sound record, and means for conducting electric current to said electromagnet for the energization thereof, the energization of said electromagnet positioning said pickup in contact with said sound record.

4. A sound record starting device in accordance with claim 3 in which said support carries indicia for indicating the position of said electromagnet thereon and said screw means includes indicia for further indicating the position of said electromagnet on said support.

5. In a sound record starting device, a support extending across said sound record and over the center thereof, an electromagnet mounted on said support and adapted to be adjusted radially above said sound record, an armature extending through said electromagnet, a sound pickup head, a carrier mounted on said armature for supporting said sound pickup head over said record, a switch, a power supply, electrical conducting means for connecting said electromagnet through said switch to said power supply, and means on said turntable for actuating said switch for energizing said electromagnet, the actuation of said electromagnet lowering said armature and said carrier and thereby placing said sound pickup device on said record.

6. A system for starting the reproduction of a sound record at a predetermined point thereon comprising, a turntable for rotating a disc record thereon, a pickup device for translating said record into electrical currents, an arm extending across said record and over the center thereof, means on said arm for resiliently lifting said device above said record at any predetermined point thereon, said means maintaining said device in a fixed position during rotation of said record, adjusting means for adjusting the position of said device along said arm over said record, and electrical means, the energization thereof overcoming the resiliency of said resilient means for lowering said device onto said record.

7. A system in accordance with claim 6 in which said lifting means comprises an electromagnet, an armature for said electromagnet, a spring for holding said armature in a raised position, and means for contacting said pickup device.

8. A device in accordance with claim 6 in which an electrical contact switch and a power source are provided together with means on said turntable for closing said switch to energize said electrical means for lowering said pickup device on said record.

9. A system for starting the reproduction of a phonograph disc record at any predetermined point thereon, a turntable for rotating a sound record, a pickup device for translating said record into corresponding electrical currents, a lifting mechanism for said pickup device, a support for said lifting mechanism, said lifting mechanism including means for adjusting the position of said mechanism on said support, an electromagnet having a core, a hook attached to said core, a track element on said pickup device adapted to accommodate the end of said hook, resilient means for holding said hook in a raised position, and switch means for controlling the energization of said electromagnet, said energization lowering said hook for placing said pickup device on said record, said switch means being actuated by said turntable when in a certain angular position.

10. A system in accordance with claim 9 in which said switch means includes a pair of electrical contact elements and a tripping element, said tripping element holding said contact elements separated until manually adjusted to a predetermined position and actuated by said turntable.

WILLARD H. TURNER.

REFERENCES CITED

The following references are of record in the file of this patent:

UNITED STATES PATENTS

| Number | Name | Date |
|---|---|---|
| 1,884,884 | Seaton | Oct. 25, 1932 |
| 1,948,377 | Hocker | Feb. 20, 1934 |
| 1,982,986 | Garlington | Dec. 4, 1934 |
| 2,053,776 | McGill | Sept. 8, 1936 |
| 2,141,804 | Thompson et al. | Dec. 27, 1938 |
| 2,307,259 | Fling | Jan. 5, 1943 |
| 2,328,628 | Eddy | Sept. 7, 1943 |
| 2,352,778 | Eddy | July 4, 1944 |
| 2,426,241 | Rodman | Aug. 26, 1947 |